United States Patent [19]

Roulinson

[11] Patent Number: 4,842,339
[45] Date of Patent: Jun. 27, 1989

[54] VEHICLE WHEEL COVER AND ASSEMBLY
[75] Inventor: Daniel A. Roulinson, Wyandotte, Mich.
[73] Assignee: Ford Motor Company, DE
[21] Appl. No.: 135,882
[22] Filed: Dec. 21, 1987
[51] Int. Cl.⁴ ............................................... B60B 7/00
[52] U.S. Cl. ................................. 301/37 S; 301/37 P; 301/108 S
[58] Field of Search .................... 301/37 R, 37 P, 37 S, 301/37 SC, 108 R, 108 S, 108 SC, 108 A, 37 TP, 37 PB

[56] References Cited

U.S. PATENT DOCUMENTS

| | | | |
|---|---|---|---|
| 2,031,092 | 2/1936 | Begg | 301/37 S |
| 2,491,506 | 12/1949 | Lyon | 301/37 C |
| 2,650,135 | 8/1953 | Lyon | 301/37 R |
| 2,738,233 | 3/1956 | Lyon | 301/37 S |
| 3,202,460 | 8/1965 | Holbrow | 301/37 S |
| 3,356,421 | 12/1967 | Trevarron | 301/37 R |
| 3,549,204 | 12/1970 | Spisak | 301/37 S |
| 3,554,536 | 1/1971 | Richter | 301/108 S |
| 3,653,719 | 4/1972 | Osawa et al. | 301/27 S |
| 3,998,494 | 12/1976 | Spisak | 301/37 P |
| 4,133,583 | 1/1979 | Spisak | 301/37 TP |
| 4,217,003 | 8/1980 | Main | 301/37 S |
| 4,382,635 | 5/1983 | Brown et al. | 301/37 S |
| 4,458,952 | 7/1984 | Forster et al. | 301/37 TP |
| 4,547,021 | 10/1985 | Daga | 301/37 P |
| 4,707,035 | 11/1987 | Kondo et al. | 301/37 S X |

FOREIGN PATENT DOCUMENTS

| | | | |
|---|---|---|---|
| 2511306 | 2/1983 | France | 301/37 TP |
| 0102702 | 8/1980 | Japan | 301/37 TP |
| 8600295 | 6/1986 | Netherlands | 301/108 S |
| 1308293 | 2/1973 | United Kingdom | 301/37 S |

Primary Examiner—Johnny D. Cherry
Assistant Examiner—Russell D. Stormer
Attorney, Agent, or Firm—Peter D. McDermott; Roger L. May

[57] ABSTRACT

A wheel cover and assembly comprising same, in which the wheel cover has a plurality of circumferentially spaced openings, each of which is aligned with one of the lug stud receiving openings of the vehicle wheel and is adapted to receive the axially outer end of a lug stud. As a retention device for the wheel cover, each of the spaced openings has at its periphery an expandable ring, a radially outer portion of the ring being trapped in an annular channel formed by the wheel cover at the periphery of the spaced opening. A radially inner portion of the expandable ring is seated against and thereby held axially inward of an annular step of a corresponding lug stud nut. The expandable ring is capable of resiliently expanding radially at least sufficiently to pass over the outer end of the lug stud nut.

15 Claims, 3 Drawing Sheets

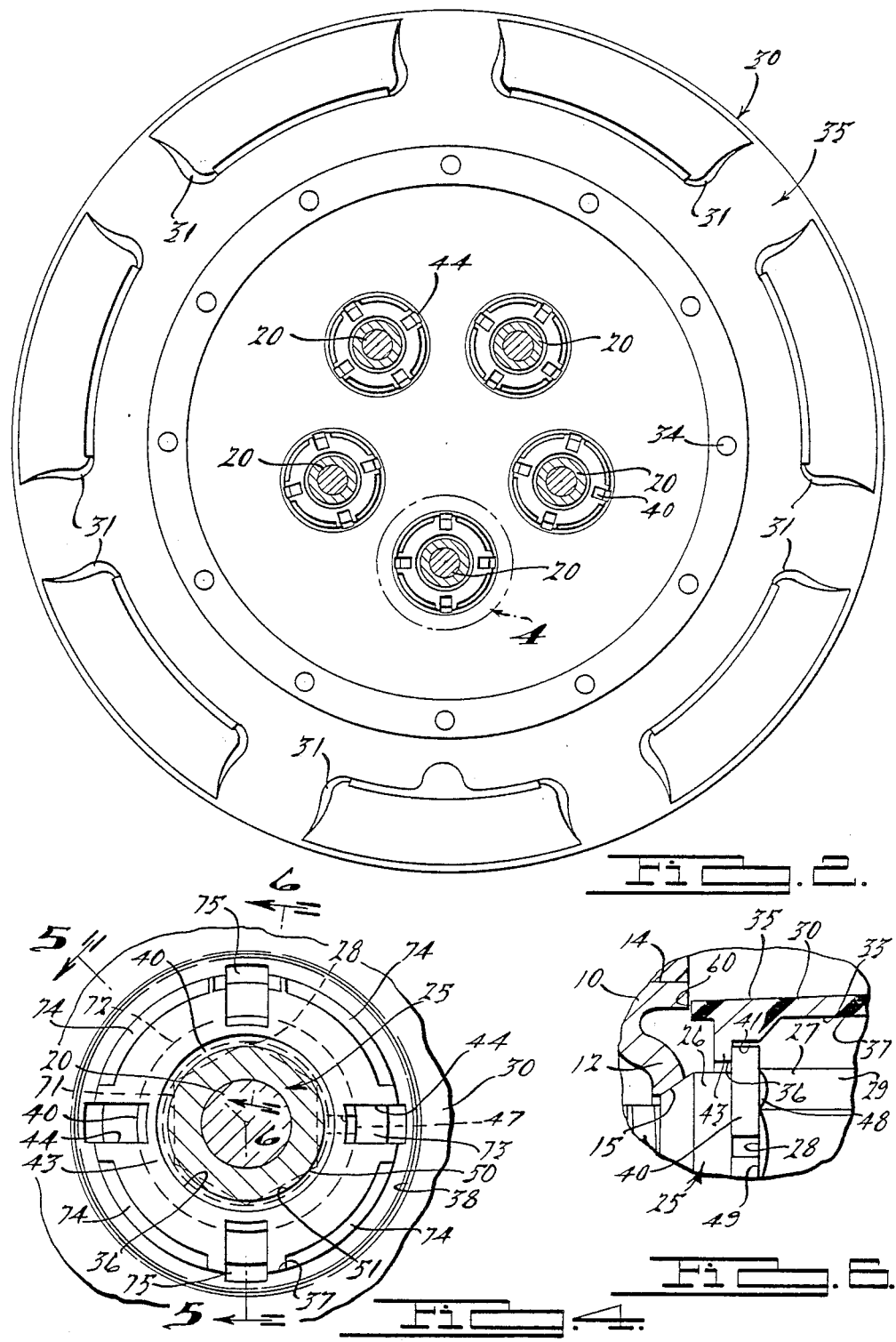

VEHICLE WHEEL COVER AND ASSEMBLY

BACKGROUND OF THE INVENTION

This invention relates to wheel covers for motor vehicle road wheels and to an assembly comprising such wheel covers mounted to a wheel.

Numerous retention means and systems are known to the skilled of the art for retaining a wheel cover to a motor vehicle wheel. It frequently is desirable to provide a wheel cover with a retention system which does not rely on any particular contour of the wheel's surface to retain the wheel cover in position. Wheel cover retention means which rely on a frictional engagement with a radially inward facing annular surface of the rim portion of a wheel or the lip flange of such rim portion are known. Such retention means, generally located at the outer periphery of the wheel cover, do not positively lock the wheel cover to the wheel and, in addition, typically prevent rotation of the wheel cover outer periphery relative to the vehicle wheel. Also, such peripheral retention means involve considerable manufacturing complexity and cost, typically requiring the use of metal bands, metal retention clips, etc. Also, the wheel cover must be of adequate weight and structure to afford a durability requisite to withstand the forces applied to the wheel cover to engage it with the vehicle wheel periphery.

Other wheel cover retention systems are known which rely on the lug stud nuts which retain the wheel to the vehicle axle. Such systems, however, generally require the use of a non-standard lug stud nut adapted to facilitate such engagement with the wheel cover. This presents both a cost and complexity penalty for such retention systems. In addition, retention means of this type typically are disadvantageous in that the vehicle wheel must be mounted onto the lug studs and held in position without benefit of the lug stud nuts while the much more fragile wheel cover is mounted over it onto the lug studs. Not only is this frequently a difficult operation to coordinate, but it presents risk of damage to the fragile wheel cover while the lug stud nuts are assembled, because during this time the heavy wheel cover is held in position by applying considerable pressure against the outer surface of the wheel cover. One such system of this type employs a so-called bulge-nut type of lug stud nut. Specifically, a wheel cover according to this system provides circumferentially spaced apertures to receive the vehicle wheel lug studs. A lug stud nut with a decorative cap, such as a bright chrome plated cap, covering the axially outward end thereof would be applied to hold both the wheel cover to the wheel and the wheel to the axle hub. Such lug stud nuts have an annular bulge axially inward of the cap, whereby an annular recess is defined between the bulge and the inboard end of the cap. A washer, typically a split ring type, would be trapped in the annular recess. The bulge would fit through the circumferentially spaced apertures in the wheel cover to sea-t against the vehicle wheel; the trapped ring would not fit through the wheel cover aperture but, rather, would seat against the outboard surface of the wheel cover peripheral to such aperture and thereby hold the wheel cover against the wheel. As noted above, this type of retention system is significantly disadvantaged in that the special lug stud nuts, i.e. the bulge nuts, involve a considerable cost disadvantage. It is disadvantaged also in that the need to mount the wheel cover to the wheel prior to securing the wheel by the lug stud nuts is a complex and difficult operation both for the vehicle manufacturer and, subsequently, for the vehicle owner or others doing work requiring removal and reinstallation of the vehicle wheel.

It is an object of the present invention to provide a wheel cover and a wheel cover assembly employing a retention means which does not require engagement with the vehicle wheel at the outer periphery of the wheel cover and which does not require non-standard lug studs or lug stud nuts. It is a further object of this invention to provide a wheel cover with a retention means, whereby such wheel cover can be mounted separately and independently to the vehicle wheel at a time following mounting of the wheel to the axle hub. Additional objects and advantages of the invention will be understood from the following description.

SUMMARY OF THE INVENTION

According to the present invention, a wheel cover is provided for a vehicle wheel having a rim portion and a spider portion, the spider portion forming a central mounting portion defining a central hub receiving opening and a plurality of circumferentially spaced lug stud receiving openings arranged radially outwardly of the central opening. The wheel cover has an outboard surface, that is, a radially extending, axially outer surface, and comprises a plurality of circumferentially spaced openings adapted (i.e., positioned, sized and oriented) to receive lug studs extending through the lug stud receiving openings of the wheel. Each of the spaced openings of the wheel cover has at its periphery an expandable ring. A radially outer portion of the expandable ring is trapped in an annular channel at the opening periphery, the ring and channel generally being in a plane substantially parallel to the spider portion of the wheel. The expandable ring is capable of resiliently expanding radially in the annular channel at least sufficiently to pass over the axially outer end of a lug stud nut by which the wheel is mounted to a vehicle.

According to a second aspect of the invention, a vehicle wheel assembly comprises:

a wheel having a rim portion and a spider portion, the spider portion having a central mounting portion and a peripheral rim engaging portion, the mounting portion defining a central hub receiving opening and a plurality of circumferentially spaced lug stud receiving openings arranged radially outwardly of the central opening;

a plurality of lug studs extending, one each, through a corresponding lug stud receiving opening of the wheel;

a plurality of lug stud nuts engaging, one each, a corresponding lug stud for operatively securing the wheel to the vehicle, each such lug stud nut comprising an inner end, an outer end axially outward of the inner end, and an annular step between the inner end and the outer end, the inner end being of smaller diameter than the outer end at such step; and a wheel cover substantially as described above.

It will be understood from the foregoing that a unique aspect of the present invention is the incorporation into a wheel cover of an expandable ring which is capable of radially expanding to fit over the end of a lug stud nut. With this arrangement, a vehicle wheel can be mounted onto a vehicle axle hub and the lug stud nuts positioned and tightened into place without involvement of the vehicle wheel cover. After the wheel is positioned and secured in place by the lug stud nuts, the wheel cover can at any time thereafter be positioned and pressed axially onto the wheel. The expandable rings are positioned over the lug stud nuts and the wheel cover is pressed toward the wheel. The expandable rings expand sufficiently to pass over the outer portion of the lug stud nut and then, once passed the annular step in the lug stud nut, return to a smaller diameter. The smaller diameter can be either the free diameter of the expandable ring or, if the expandable ring seats against the outer surface of the axially inner portion of the lug stud nut, the diameter of the axially inner portion of the lug stud nut. Once the expandable ring has returned to such smaller diameter, it is caught by the annular step of the lug stud nut and is held axially inward thereof. Because the expandable rings are trapped in annular channels formed at the periphery of the circumferentially spaced openings of the wheel cover, the wheel cover is, in turn, trapped in position on the wheel. To remove the wheel cover thereafter, the lug stud nuts can be removed.

It will be appreciated by those skilled in the art that the present invention provides several significant advantages over wheel cover assemblies previously known to the art. Thus, as described further below, the lug stud nut need not be of the expensive "bulge nut" variety but, rather, the annular step in the lug stud nut can be provided by a radially outwardly flared inner end of a lug stud nut cap (such as a decorative cap) fitted on the outer portion of the lug stud nut. Another significant advantage is that the expandable rings are trapped in annular channels formed at the periphery of circumferentially spaced openings of the wheel cover. For this reason the rings are far less likely to be lost or omitted when mounting and demounting the wheel cover. If the expandable ring is a split metal ring according to preferred embodiments discussed further below, it is easily assembled in the wheel cover by radially compressing it, positioning it within the plane of the annular channel and allowing it to return to its free diameter, whereby a radially outer portion of the ring enters the channel. Various alternative types of expandable rings and assembly techniques suitable for the present invention will be apparent to those skilled in the art in view of the present disclosure. Arrangements in which a washer simply was seated against an outboard surface of a wheel cover and not trapped in a channel formed within the wheel cover, that is an arrangement in which such ring or washer was not integrated with the wheel cover, to be held against the wheel cover for purposes of retaining the wheel cover to a vehicle wheel, would necessarily be positioned separately onto the lug studs and would add substantial complexity and difficulty to the task of mounting a wheel cover to a wheel. Additionally, such non-integrated rings or washers would be prone to loss and might be intentionally or unintentionally omitted, whereby the security of the wheel cover mounting would be impaired.

Further characteristics and advantages of the invention will become apparent from the following description and accompanying drawings, in which:

FIG. 2 is a plan view of the inboard face of the wheel cover of FIG. 1 seen from immediately outboard the vehicle wheel to which the wheel cover of the assembly is mounted;

FIG. 4 is an enlarged view of portion 4 of FIG. 2;

FIG. 6 is an enlarged sectional view taken through line 6—6 of FIG. 4.

DETAILED DESCRIPTION OF PREFERRED EMBODIMENTS

Figure 1:
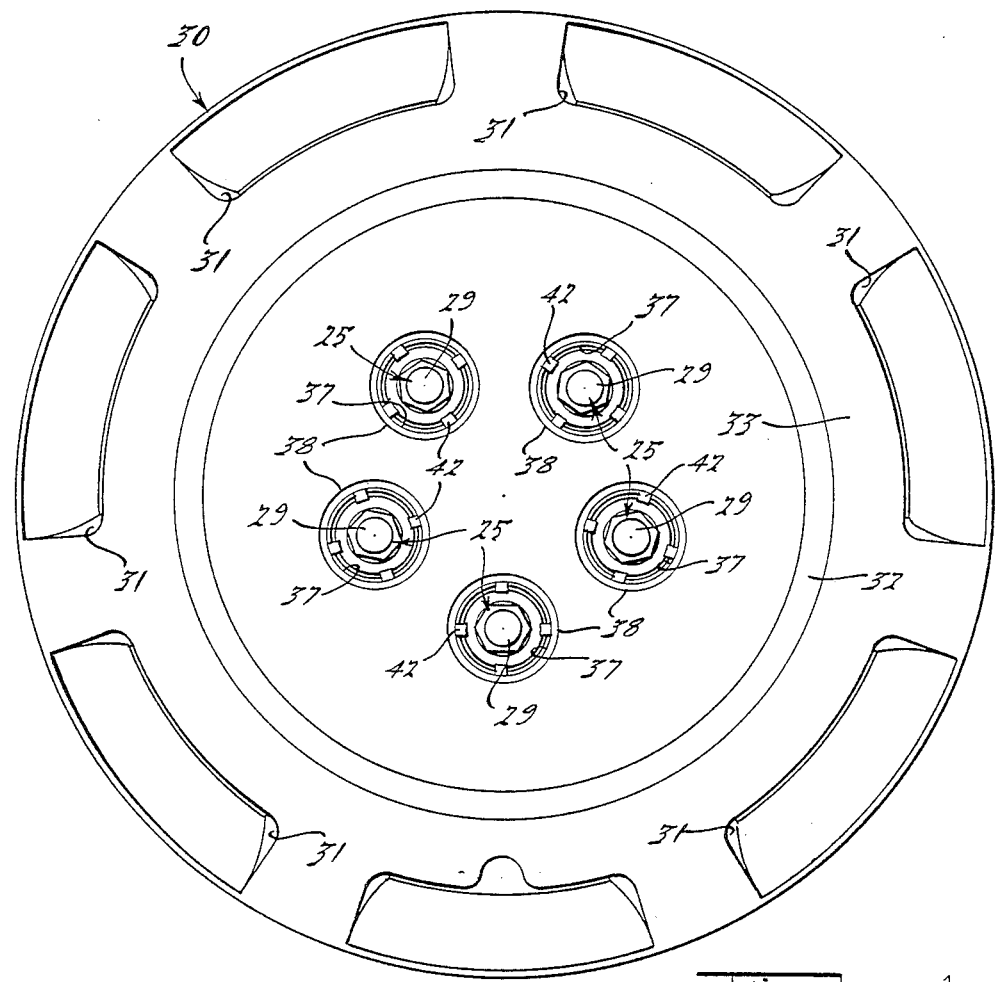
FIG. 1 is a plan view of the outboard face of a wheel cover assembly according to the present invention, comprising a wheel cover according to the invention.
Figure 5:
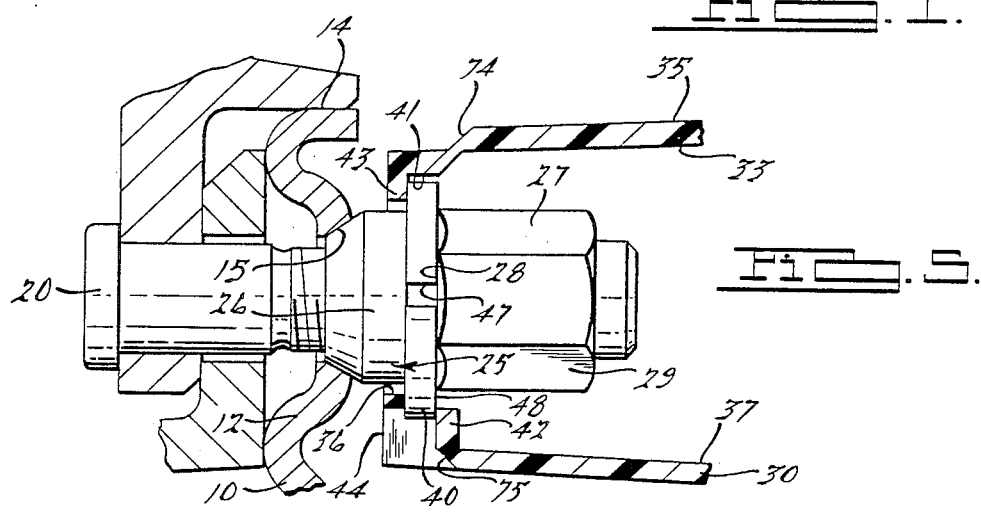
FIG. 5 is an enlarged sectional view taken through line 5—5 of FIG. 4.

Referring now to the drawings, a vehicle wheel assembly according to a preferred embodiment of the invention is seen to comprise a wheel 10 having a rim portion 11 and a spider portion 12. The spider portion has a rim engaging portion 13 and a mounting portion defining a central hub receiving opening 14 and a plurality of circumferentially spaced lug stud receiving openings 15 arranged radially outwardly of the central opening. Lug studs 20 extend, one each, through corresponding ones of the lug stud receiving openings 15 of the wheel. Each of the lug studs 20 has a lug stud nut 25 threaded onto its outboard end to secure the vehicle wheel 10 to the vehicle axle hub. Each of the lug stud nuts has an inner end 26, that is an axially inward end, and an outer end 27 axially outward of the inner end, and an annular step 28 between such inner end and outer end. The annular step defines a change in diameter in a lug stud nut. Specifically, the inner end of the nut is of smaller diameter than the outer end of the nut at such annular step. As best seen in FIGS. 5 and 6, the annular step is spaced axially outwardly of the point at which the lug stud nut engages the vehicle wheel.

In the preferred embodiment of the invention shown in the drawings, the lug stud nut 25 has a decorative (for example, chrome plated) cap 29 fitted on the outer end of the lug stud nut. Such cap can be formed of thin sheet metal and according to this embodiment the annular step 28 of the lug stud nut is provided by radially outwardly flaring the bottom end (that is, the axially inboard end) of the cap to provide a lip in the nature of a radially extending flange at the base of the cap. This annular step and the space between it and the point of connection between the lug stud nut and the vehicle wheel are employed in the mounting of the wheel cover of the invention as is more fully described below.

Wheel cover 30 is shown in the drawings to have certain non-essential aesthetic and decorative features which are exemplary only. Thus, in the radially outer portion of the wheel cover, vent openings 31 are seen to be provided in a generally rectangular shape and a decorative strip 32 is provided on the outboard surface 33 of the wheel cover with attachment means 34 extending through to the inboard surface 35 of the wheel cover. In general, the wheel cover overlays at least a central area of the spider portion of the wheel. It is formed with a plurality of circumferentially spaced openings 36, each of which is aligned with one of the lug stud receiving openings 15 of the spider portion of the wheel. In assembly, a lug stud would extend through each of the spaced openings of the wheel cover. A lug stud nut also would extend through the spaced openings in the wheel cover. More specifically, the above-described outer end of a lug stud nut would extend axially outwardly of the opening and the inner end of the lug stud nut would extend axially inwardly thereof.

Figure 3:
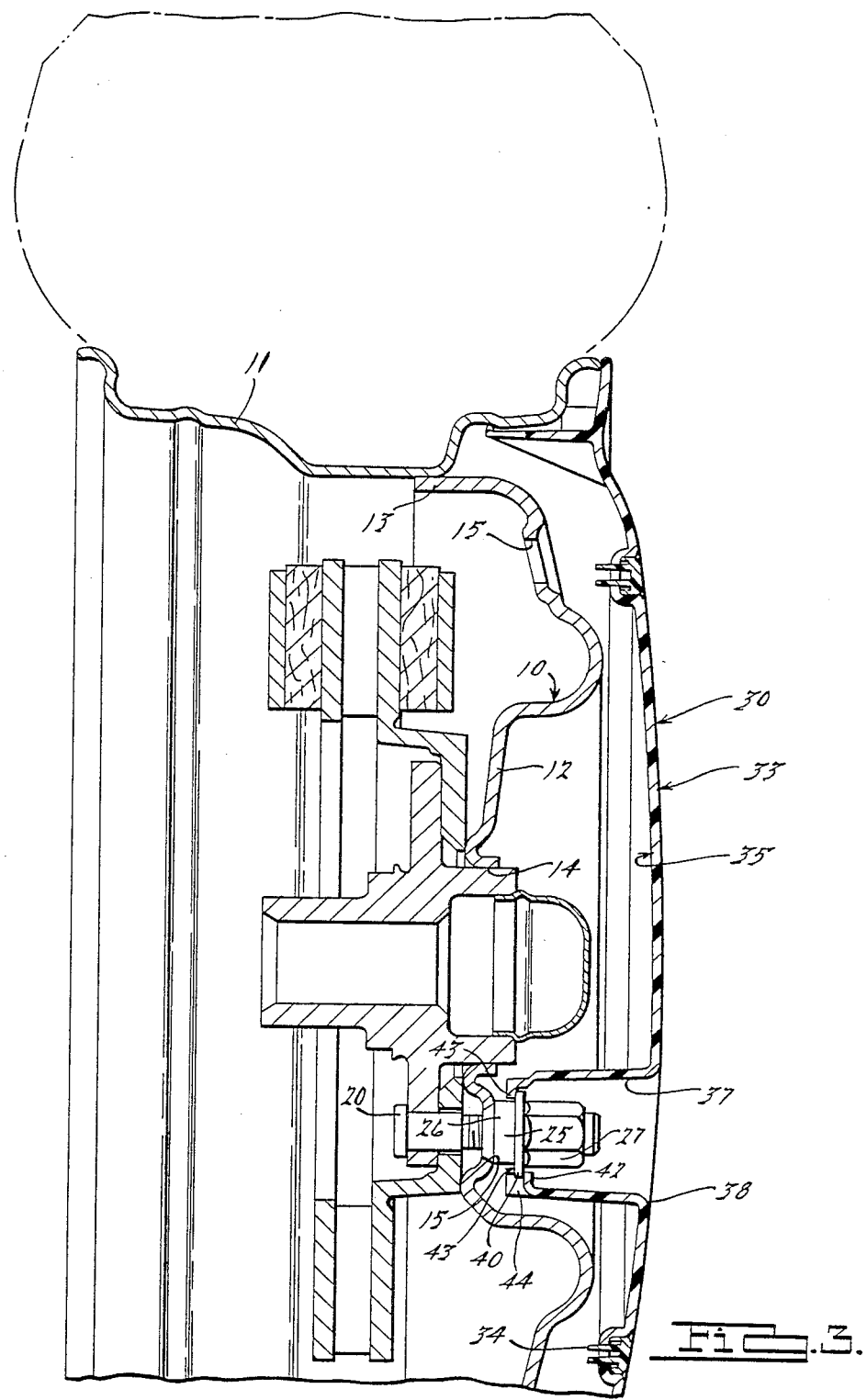
FIG. 3 is a cross-sectional view of the vehicle wheel assembly of FIG. 1.

The preferred embodiment of the wheel cover as shown in the drawings comprises axially inwardly extending wells 37. Such wells typically would be formed with a rounded shoulder beginning at crease 38. As best seen in FIGS. 3, 5 and 6, the outer end of each lug stud nut is disposed within a corresponding one of such wells. The circumferentially spaced openings 36 of the wheel cover are located, one each, in a corresponding well bottom. Each of the spaced openings has at its periphery an expandable ring 40. As best seen in FIG. 5, the expandable ring 40 is trapped in an angular channel 41. The preferred embodiment of the annular channel shown is defined by outer retention means 42, meaning retention means axially outward of the expandable ring 40, and inner retention means 43. More specifically, the outer retention means comprises nubbins 42 extending radially inwardly from the well wall. In the embodiment shown there are four such nubbins equally circumferentially spaced. The inner retention means comprises a radially inwardly extending flange 43 at the very bottom of the well.

The main body of the wheel cover can be formed, for example, of plastic, including the wells, the annular channels at the periphery of the circumferentially spaced openings of the wheel cover being unitary therewith. Thus, in the embodiment shown in the drawings the wheel cover can be, for example, injection molded of plastic. In that case, to form the nubbins 42 circumferentially spaced slots 44 are provided in the inwardly extending annular flange 43. One such slot is provided extending axially through the flange in axial alignment with a corresponding one of the nubbins. Such slots are not necessary to the functioning of the invention, but provide an aperture through which a post can extend during the injection molding process to define the bottom surface of the nubbin. Following injection molding of the part, prior to removing the part from the molding cavity, the post is withdrawn back through the now-formed slot in flange 43. For purposes of improved strength and durability of the annular channel formed to trap the expandable ring, it is preferred that the slot not extend the full radial dimension of the annular flange. That is, it is preferred that the annular flange have an inner annular portion which is circumferentially uninterrupted. Optionally, however, the annular channel can be formed simply by providing nubbins 42 as the outer retention means, and other nubbins as the inner retention means in place of flange 43, such other nubbins preferably being circumferentially offset from nubbins 42. Suitable techniques for manufacturing these and other alternative configurations for the aforesaid annular channel will be apparent to the skilled of the art in view of the present disclosure.

The expandable ring 40 is seen to have a gap 47. This gap allows the expandable ring to be radially compressed, whereby its outside diameter will be smaller than the inside diameter of the opening defined by nubbins 42. In this way the expandable ring can be assembled into the annular channel. As seen in the preferred embodiment of the drawings, the annular channel and the expandable ring are oriented in a plane substantially parallel to the spider portion of the wheel. Preferably the expandable ring is a metal split ring of substantially rectangular cross-section. The rectangular cross-section provides flat upper and lower surfaces. The flat lower surface provides pressure distribution against the outboard surface of flange 43 and the flat upper surface locks securely under the annular step 28 of the lug stud nut 25. It can be seen in FIG. 5 that the upper surface of the expandable ring is in contacting relationship with the outwardly radially flared, flange-like base 28 of the lug stud nut cap 29.

Referring to FIG. 4, it can be seen that the outside diameter 50 of the lower portion of lug stud nut 20 is in contacting relationship with the inside diameter 51 of the expandable ring 40. It will be understood, of course, that the inside diameter of the expandable ring need not seat against the outside diameter of the lug stud nut. It is essential only that the radially inner portion of the expandable ring 40 extend under the annular step 28 of the lug stud nut and that the radially outer portion of the expandable ring 40 be trapped within the annular channel 41 of the wheel cover. In this way, the lug stud nut presses axially inwardly against the expandable ring and the expandable ring presses against the walls of the annular channel to retain the wheel cover to the vehicle wheel.

As described above, the vehicle wheel is assembled to the vehicle with the lug stud nuts being threaded onto the lug studs. Thereafter, the wheel cover can be mounted to the vehicle wheel by pressing it axially inwardly against the lug stud nuts sufficiently to cause the expandable rings 40 to expand and pass over the outer portion of the lug stud nuts. For this purpose, it is preferred that the outer portion of the lug stud nut provide bevelled or rounded shoulders and/or have an outside diameter which increases substantially continuously to facilitate the expansion of the expandable ring. The expandable ring also could be provided with a bevelled inner edge on its lower surface to facilitate its passing over even a discontinuous increase in the diameter of the lug stud nut. In this context, a continuous increase in the outside diameter of the lug stud nut does not necessarily mean a constant increase but, rather, merely that any portion of the outer end of lug stud nut which increases should do so smoothly. Also, it should be understood that the outer end of the lug stud nut need not be round in cross-section but, rather, can be hexagonally shaped to facilitate the use of a lug wrench to install and remove the lug stud nuts from the lug studs. Other configurations consistent with the invention will be apparent to the skilled of the art in view of the present disclosure.

Referring now specifically to FIG. 6, it will be seen that the preferred embodiment of the invention shown therein provides a stop 60 extending axially inwardly from the bottom of the wheel cover well to rest against the outboard end of hub receiving opening 14. This stop 60 helps prevent axial motion of the wheel cover on the wheel and therefore helps prevent rattling noises, etc.

Referring now specifically to FIG. 4, an enlargement is shown of segment 4 in FIG. 2, this being a view of the inboard face of the wheel cover of the invention taken from immediately outboard the spider portion of the wheel. Therein can be seen many of the features already discussed and described above. Shown in phantom is the radially outer edge 71 of the flange-like base of lug stud cap 29. Also shown, partially in phantom, is the outside diameter 72 of the expandable ring 40. The bottom 73, that is the axially inward surface, of the nubbins 42 can be seen through slots 44. A bevelled surface 74 can be seen extending in segments around the lower portion of the wheel cover well and a bevelled surface 75 can be seen through slots 44. Such bevelled surfaces facilitate manufacture of the wheel cover embodiment shown. It will be apparent to the skilled of the art in view of the foregoing disclosure of preferred embodiments that alternative embodiments incorporating modifications and variations in one or more features of the invention will be within the skill of the art. All such variations and modifications are included within the scope of the following claims.

I claim:

1. A vehicle wheel assembly comprising:
    a wheel having a rim portion and a spider portion, said spider portion having a central mounting portion and a peripheral rim engaging portion, said mounting portion defining a central hub receiving opening and a plurality of circumferentially spaced lug stud receiving openings arranged radially outwardly of said central opening;
    a plurality of lug studs extending, one each, through a corresponding one of said lug stud receiving openings of said wheel;
    a plurality of lug stud nuts engaging, one each, a corresponding one of said lug studs for operatively securing said wheel to the vehicle, each said lug stud nut comprising an inner end, an outer end axially outward of said inner end, and an annular step between said inner end and said outer end, said inner end being of smaller diameter than said outer end at said step; and
    a wheel cover overlaying at least a central area of said spider portion, being formed with a plurality of circumferentially spaced openings, each of which is aligned with one of said lug stud receiving openings of said spider portion and through each of which spaced openings extends the outer end of a corresponding one of said lug stud nuts, each of said spaced openings having at its periphery an expandable ring, a radially outer portion of said expandable ring being trapped in an annular channel formed by said wheel cover at said periphery, a radially inner portion of each said expandable ring being seated against and thereby held axially inward of said annular step of a corresponding one of said lug stud nuts, and said expandable ring being capable of resiliently expanding radially in said annular channel to pass over said outer end of said lug stud nuts.

2. The vehicle wheel assembly according to claim 1, wherein said channel and said ring are in a plane substantially parallel to said spider portion of said wheel.

3. The vehicle wheel assembly according to claim 1, wherein said annular channel is defined by outer retention means and inner retention means, said outer retention means being spaced axially outward of said inner retention means.

4. The vehicle wheel assembly according to claim 3, wherein said outer retention means is unitary with said inner retention means, both being formed of plastic said outer retention means comprising circumferentially spaced, radially inwardly extending nubbins and said inner retention means comprising a radially inwardly extending annular flange having circumferentially spaced slots extending axially therethrough, each in axial alignment with a corresponding one of said nubbins.

5. The vehicle wheel assembly according to claim 4, wherein said slots extend radially less than the radial dimension of said annular flange.

6. The vehicle wheel assembly according to claim 1, wherein said wheel cover is formed with axially inwardly extending wells, said spaced openings, one each, being located in a corresponding well bottom and each said lug stud nut outer end being disposed within a corresponding one of said wells.

7. The vehicle wheel assembly according to claim 1, wherein said outer end of each said lug stud nut has a diameter increasing substantially continuously to that of said step from a lesser diameter axially outward of said step.

8. The vehicle wheel assembly according to claim 1, wherein said step of each said lug stud nut is formed by a radially outwardly flared, axially inward end of a decorative lug stud nut cap fitted on said outer end of said lug stud nut.

9. The vehicle wheel assembly according to claim 1, wherein said expandable ring is a metal split ring of substantially rectilinear cross-section.

10. A wheel cover for a vehicle wheel having a spider portion forming a central mounting portion defining a central hub receiving opening and a plurality of circumferentially spaced lug stud receiving openings arranged radially outwardly of said central opening, said wheel cover comprising a plurality of circumferentially spaced openings adapted to receive lug studs extending through the lug stud receiving openings of the wheel, each of said spaced openings having at its periphery an expandable ring, a radially outer portion of said expandable ring being trapped in an annular channel formed by said wheel cover at said periphery, said expandable ring being capable of resiliently expanding radially in said annular channel, wherein said annular channel is defined by outer retention means integral with said wheel cover and inner retention means integral with said wheel cover, said outer retention means being spaced axially outward of said inner retention means.

11. The wheel cover according to claim 10, wherein said outer retention means is unitary with said inner retention means, both being formed of plastic, said outer retention means comprising circumferentially spaced, radially inwardly extending nubbins and said inner retention means comprising a radially inwardly extending annular flange having circumferentially spaced slot extending axially therethrough, each in axial alignment with a corresponding one of said nubbins.

12. The wheel cover according to claim 11, wherein said slot extends radially less than the radial dimension of said annular flange.

13. The wheel cover according to claim 10, wherein said wheel cover is formed with axially inwardly extending wells, said spaced openings, one each, located in a corresponding well bottom.

14. The wheel cover according to claim 10, wherein said expandable ring is a metal split ring of substantially rectilinear cross-section.

15. A vehicle wheel assembly comprising:
    a wheel having a rim portion and a spider portion, said spider portion having a central mounting portion and a peripheral rim engaging portion, said mounting portion defining a central hub receiving opening and a plurality of circumferentially spaced lug stud receiving openings arranged radially outwardly of said central opening;
    a plurality of lug studs extending, one each, through a corresponding one of said lug stud receiving openings of said wheel;
    a plurality of lug stud nuts engaging, one each, a corresponding one of said lug studs for operatively securing said wheel to the vehicle, each said lug stud nut comprising an inner end, an outer end including a decorative lug stud nut cap axially outward of said inner end, and an annular step between said inner end and said outer end formed by a radially outwardly flared, axially inward end of said lug stud nut cap, whereby said inner end has a smaller diameter than said outer end at said annular step; and a wheel cover overlaying at least a central area of said spider portion, being formed with axially inwardly extending wells and with a plurality of circumferentially spaced openings located, one each, in a well bottom at an axially inward end of a corresponding one of said wells, each said lug stud nut outer end being disposed within a corresponding one of said wells and each of said spaced openings having at its periphery a metal split ring of substantially rectilinear cross-section, wherein a radially outer portion of said split ring is trapped in an annular channel formed by:

(i) circumferentially spaced plastic nubbins extending radially inwardly in said well, and
(ii) an annular plastic flange extending radially inwardly in said well and spaced axially inwardly of said nubbins, having circumferentially spaced slots which extend axially therethrough in axial alignment with said nubbins and which extend radially at least coextensively with said nubbins but less than the radial dimension of said annular flange, a radially inner portion of said split ring being seated against and thereby held axially inwardly of said annular step of said lug stud nut, said ring being capable of resiliently expanding radially in said annular trough to pass over said outer end of said lug stud nut.

* * * * *